(12) United States Patent
Yang et al.

(10) Patent No.: US 6,469,988 B1
(45) Date of Patent: Oct. 22, 2002

(54) LOW-LEVEL CIRCUIT IMPLEMENTATION OF SIGNAL FLOW GRAPHS FOR REAL-TIME SIGNAL PROCESSING OF HIGH-SPEED DIGITAL SIGNALS

(75) Inventors: Kewei Yang, San Jose, CA (US); Feng Cheng Lin, Union City, CA (US); Yang Jing Ke, Union City, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/349,832

(22) Filed: Jul. 8, 1999

Related U.S. Application Data

(63) Continuation-in-part of application No. 08/986,430, filed on Dec. 7, 1997, now Pat. No. 6,065,077, and a continuation-in-part of application No. 09/163,294, filed on Sep. 29, 1998, and a continuation-in-part of application No. 09/281,749, filed on Mar. 30, 1999.

(51) Int. Cl.[7] ............................. H04B 3/20; H04B 1/38; H04L 5/16; H04D 1/04
(52) U.S. Cl. ....................... 370/289; 370/296; 375/220; 375/346
(58) Field of Search ................................. 370/289, 282, 370/286, 290, 294, 296; 375/220, 346; 379/412

(56) References Cited

U.S. PATENT DOCUMENTS

| | | |
|---|---|---|
| 4,315,308 A | 2/1982 | Jackson |
| 4,438,494 A | 3/1984 | Budde et al. |
| 4,480,307 A | 10/1984 | Budde et al. |
| 5,161,156 A | 11/1992 | Baum et al. |
| 5,271,000 A | 12/1993 | Engbersen et al. |
| 5,313,609 A | 5/1994 | Baylor et al. |
| 5,335,335 A | 8/1994 | Jackson et al. |
| 5,440,698 A | 8/1995 | Sindhu et al. |
| 5,505,686 A | 4/1996 | Willis et al. |
| 5,511,226 A | 4/1996 | Zilka |

(List continued on next page.)

OTHER PUBLICATIONS

Technical White Paper, Sun TM Enterprise TM 10000 Server, Sun Microsystems, Sep. 1998.

(List continued on next page.)

*Primary Examiner*—Tan V. Mai
(74) *Attorney, Agent, or Firm*—Keith Kind; Kelly H. Hale

(57) ABSTRACT

Signal processing techniques are applied to data rates at state-of-the-art circuit speeds (presently 1.6 Gbit/sec) by carrying out the signal flow graph of a cannonical FIR filter algorithm using hybrid analog and digital circuit techniques. A plurality of digital to analog converters (DACs) generate analog currents that are the analogue of the tap coefficients of the FIR filter model. The DACs are used as programmable current sources for the tail current sources of respective differential pair stages. Differential delay signals that are the analogue of the FIR delay-line tap signals are connected to the inputs of respective ones of the differential pair stages. The drains of the input devices of the differential pair stages are connected in parallel to common complementary load circuits. The delay signals act to steer the tap coefficient currents to one or the other of the common load circuits. The parallel connection to common load circuits acts to sum the currents sunk (if any) by each of the commonly connected input devices. This current summation is the analogue of the FIR accumulator. Because the tap coefficient currents are readily programmable, the filter may be adaptive. An illustrative embodiment uses the invention in a transceiver for high-speed full-duplex (bi-directional simultaneous) signaling over a single channel interconnect. An adaptation algorithm is used at system initialization to train the tap coefficients according to the particular channel characteristics. The invention enables reliable extraction of receive-signals from the inherent ringing induced by the channel interconnect and at higher data rates than previously possible.

16 Claims, 15 Drawing Sheets

U.S. PATENT DOCUMENTS

| | | |
|---|---|---|
| 5,513,335 A | 4/1996 | McClure |
| 5,524,234 A | 6/1996 | Martinez, Jr. et al. |
| 5,526,380 A | 6/1996 | Izzard |
| 5,535,363 A | 7/1996 | Prince |
| 5,537,569 A | 7/1996 | Masubuchi |
| 5,537,575 A | 7/1996 | Foley |
| 5,553,310 A | 9/1996 | Taylor et al. |
| 5,561,779 A | 10/1996 | Jackson |
| 5,568,620 A | 10/1996 | Sarangdhar et al. |
| 5,574,868 A | 11/1996 | Marisetty |
| 5,577,204 A | 11/1996 | Brewer et al. |
| 5,581,729 A | 12/1996 | Nishtala et al. |
| 5,588,131 A | 12/1996 | Borrill |
| 5,594,886 A | 1/1997 | Smith et al. |
| 5,602,814 A | 2/1997 | Jaquette et al. |
| 5,606,686 A | 2/1997 | Tarui et al. |
| 5,634,043 A | 5/1997 | Self et al. |
| 5,634,068 A | 5/1997 | Nishtala et al. |
| 5,644,754 A | 7/1997 | Weber |
| 5,655,100 A | 8/1997 | Ebrahim et al. |
| 5,657,472 A | 8/1997 | Van Loo et al. |
| 5,682,516 A | 10/1997 | Sarangdhar et al. |
| 5,684,977 A | 11/1997 | Van Loo et al. |
| 5,696,910 A | 12/1997 | Pawlowski |
| 5,796,605 A | 8/1998 | Hagersten |
| 5,829,034 A | 10/1998 | Hagersten et al. |
| 5,895,495 A | 4/1999 | Arimilli et al. |
| 5,897,656 A | 4/1999 | Vogt et al. |
| 5,940,856 A | 8/1999 | Arimilli et al. |
| 5,946,709 A | 8/1999 | Arimilli et al. |
| 5,978,411 A | 11/1999 | Kitade et al. |
| 6,044,122 A | 3/2000 | Ellersick et al. |
| 6,065,077 A | 5/2000 | Fu |
| 6,125,429 A | 9/2000 | Goodwin et al. |
| 6,145,007 A | 11/2000 | Dokic et al. |
| 6,167,133 A * | 12/2000 | Caceres ...................... 370/289 |
| 6,279,084 B1 | 8/2001 | VanDoren et al. |
| 6,289,420 B1 | 9/2001 | Cypher |
| 6,292,705 B1 | 9/2001 | Wang et al. |

OTHER PUBLICATIONS

Alan Charlesworth, Starfire: Extending the SMP Envelope, IEEE Micro, Jan./Feb. 1998, pp. 39–49.

Joseph Heinrich, Origin TM and Onyz2 TM Theory of Operations Manual, Document No. 007–3439–002, Silicon Graphics, Inc., 1997.

White Paper, Sequent's NUMA–Q SMP Architecture, Sequent, 1997.

White Paper, Eight–way Multiprocessing, Hewlett–Packard, Nov. 1997.

George White & Pete Vogt, Profusion, a Buffered, Cache-Coherent Crossbar Switch, presented at Hot Interconnects Symposium V, Aug. 1997.

Alan Charlesworth, et al., Gigaplane–XB: Extending the Ultra Enterprise Family, presented at Hot Interconnects Symposium V, Aug. 1997.

James Loudon & Daniel Lenoski, The SGI Origin: A ccNUMA Highly Scalable Server, Silcon Graphics, Inc., presented at the Proc. Of the $24^{th}$ Int'l Symp. Computer Architecture, Jun. 1997.

Mike Galles, Spider: A High–Speed Network Interconnect, IEEE Micro, Jan./Feb. 1997, pp. 34–39.

T.D. Lovett, R.M. Clapp and R. J. Safranek, NUMA–Q: an SCI–based Enterprise Server, Sequent, 1996.

Daniel E. Lenoski & Wolf–Dietrich Weber, Scalable Shared-Memory Multiprocessing, Morgan Kaufmann Publishers, 1995, pp. 143–159.

David B. Gustavson, The Scalable coherent Interface and Related Standards Projects, (as reprinted in Advanced Multimicroprocessor Bus Architectures, Janusz Zalewski, IEEE computer Society Press, 1995, pp. 195–207.).

Kevin Normoyle, et al., UltraSPARC TM Port Architecture, Sun Microsystems, Inc., presented at Hot Interconnects III, Aug. 1995.

Kevin Normoyle, et al., UltraSPARC TM Port Architecture, Sun Microsystems, Inc., presented at Hot Interconnects III, Aug. 1995, UltraSparc Interfaces.

Kai Hwang, Advanced Computer Architecture: Parallelism, Scalability, Programmability, McGraw–Hill, 1993, pp. 355–357.

Jim Handy, The Cache Memory Book, Academic Press, 1993, pp. 161–169.

Angel L. Decegama, Parallel Processing Architectures and VLSI Hardware, vol. 1, Prentice–Hall, 1989, pp. 341–344.

* cited by examiner

LOW-LEVEL CIRCUIT IMPLEMENTATION OF SIGNAL FLOW GRAPHS FOR REAL-TIME SIGNAL PROCESSING OF HIGH-SPEED DIGITAL SIGNALS

CROSS-REFERENCE TO RELATED APPLICATIONS

This patent application is a continuation-in-part of the following commonly-owned, copending U.S. patent application Serial Nos.: U.S. application Ser. No. 08/986,430, AN APPARATUS AND METHOD FOR A CACHE COHERENT SHARED MEMORY MULTIPROCESSING SYSTEM, filed Dec. 7, 1997 now U.S. Pat. No. 6,065,077; U.S. application Ser. No. 09/163,294, METHOD AND APPARATUS FOR ADDRESS TRANSFERS, SYSTEM SERIALIZATION, AND CENTRALIZED CACHE AND TRANSACTION CONTROL, IN A SYSMETRIC MULTI-PROCESSOR SYSTEM, filed Sep. 29, 1998; and U.S. application Ser. No. 09/281,749, CACHE INTERFACE AND PROTOCOLS FOR CACHE COHERENCY IN A SCALABLE SYMMETRIC MULTIPROCESSOR SYSTEM, filed Mar. 30, 1999; all of which are incorporated by reference herein.

BACKGROUND

Within any given integrated circuit technology and due to a number of factors, signal processing techniques have been limited to signal frequencies and data rates at substantially less than state-of-the-art circuit speeds. As but one example of how this has limited the electronic arts, the transmission rate of a high-speed communication channel between two integrated circuits having no external components has been limited by the ability to reliably extract receive signals from the inherent ringing induced by the channel interconnect. Above certain speeds, and without the benefit of external components, it has been presumed that reliable transmission was not possible, as there has been no ability to do time-domain wave shaping in real-time.

Classical analog time/frequency-domain filter-techniques have been precluded by the lack of predictable time constants or the need for undesirable large or discrete components, especially bulky inductors. Switched-capacitor filter implementations require expensive (power, area) and relatively frequency limited operational amplifiers and relatively large precision-area-ratio capacitors.

Digital signal processing (DSP) techniques, such as the finite impulse response (FIR) filter, only require basic DSP building blocks including delay elements, multipliers, and accumulators. All these functions are easily implemented with complete accuracy in the digital domain. The FIR filter is especially suited for adaptive filtering techniques as taught in "Adaptive Filters—A Review of Techniques," by Hughes, et al., appearing as chapter 3 in "Digital Signal Processing in Telecommunications," edited by F. A. Westall, et al., published in 1993 by Chapman & Hall, London. Unfortunately, the basic DSP building blocks are expensive to implement as digital logic or they require software implementations that function at a fraction of the channel speed.

For general computer applications, there are a large number of channels operating at roughly the same rate. Thus expensive solutions, even if possible for a single pair of channel transceivers, are not practical options, as the large number of simultaneously operating channels prohibitively multiplies their expense.

SUMMARY

Signal processing techniques may be applied to data rates at state-of-the-art circuit speeds (presently 1.6 Gbit/sec) by using hybrid analog and digital circuit techniques to carry out the signal flow graph of a canonical FIR filter algorithm. The FIR filter makes use of a tapped delay line, multipliers, multiplier tap coefficients, and an accumulator. As one example of how this technique benefits the electronic arts, the transmission rate of a high-speed communication channel between two integrated circuits having no external components can be substantially extended over prior art efforts. This is due to the ability to reliably extract receive signals from the inherent ringing induced by the channel interconnect.

More specifically, the circuit techniques include the following. A plurality of delay signals (delayed versions of the signal to be filtered) are generated. These delay signals are the analogue of the tap signals of the tapped delay line of the FIR filter model. Each binary (0, 1) tap signal is mapped into a differential switching logic signal pair (+1, −1).

A plurality of digital to analog converters (DACs) generate analog currents that are the analogue of the tap coefficients of the FIR filter model. The DACs are used as programmable current sources for the tail current sources of respective differential pair stages. The drains of the input devices of the differential pair stages are connected in parallel to common complementary load circuits. The differential delay signals are connected to the inputs of respective ones of the differential pair stages. The delay signals act to steer the tap coefficient currents to one or the other of the common load circuits. In particular, a logical one maps to an analog +1, which turns on the associated differential-pair input device and routes the entirety of the tail current through the "turned-on" input device and to the associated load circuit for summation with current contributions from other "turned-on" input devices. A logical zero maps to an analog −1, which turns off the associated differential-pair input device. The parallel connection to common load circuits acts to sum the currents sunk (if any) by each of the commonly connected input devices. This current summation is the analogue of the FIR accumulator. Because the tap coefficient currents are readily programmable, the filter may be adaptive.

The present invention finds particular application in the design of the channel interface circuitry for contemporary high-speed multiprocessor systems, such as those disclosed in the applications previously incorporated by reference above.

DETAILED DESCRIPTION

System Overview

Figure 1:
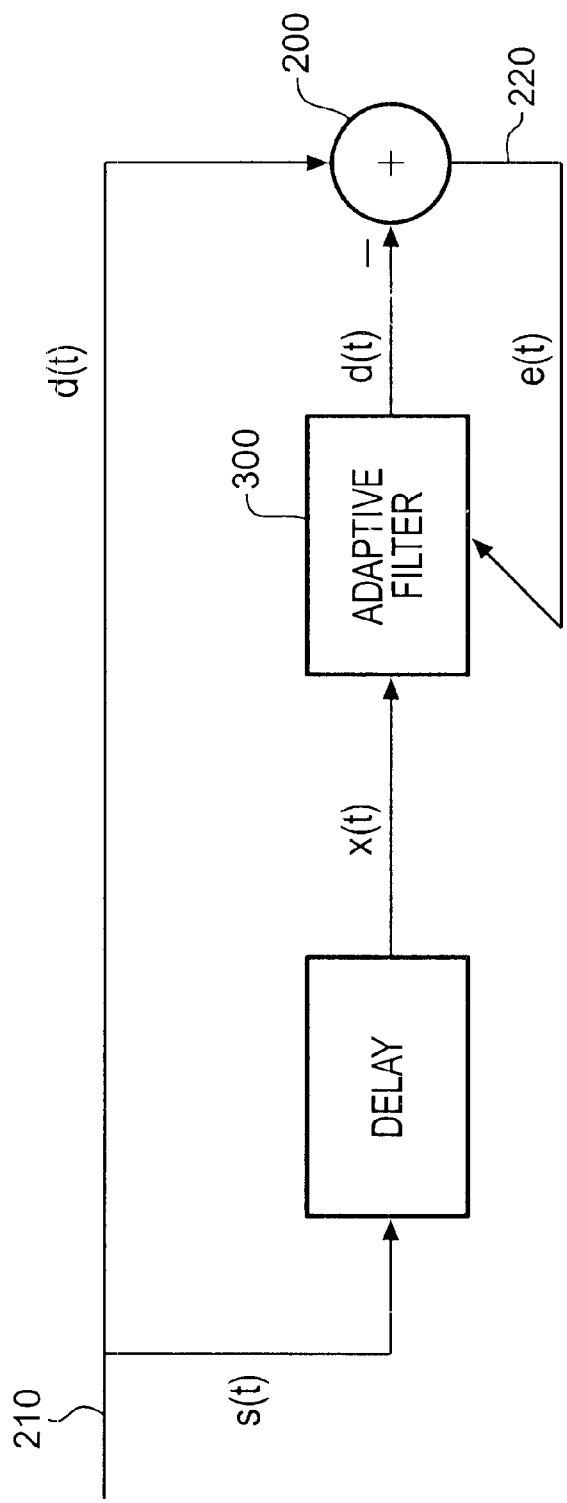
FIG. 1 shows a prior-art canonical linear predictive system.

Preferred embodiment uses a variant of a specific type of closed loop adaptive filter known as a linear predictive system (or linear predictor). FIG. 1 shows a canonical form of linear predictor. The linear predictive system uses the adaptive filter 300 to model the characteristics of a signal so that its future value can be predicted from its previous values. This closed loop adaptive filter compares (using the positive and negative inputs to summer 200) an idealized signal 210 with the output of the adaptive filter to generate an error term 220. An adaptation algorithm modifies the transfer characteristics of the adaptive filter in an attempt to drive the error term to zero.

Figure 2:
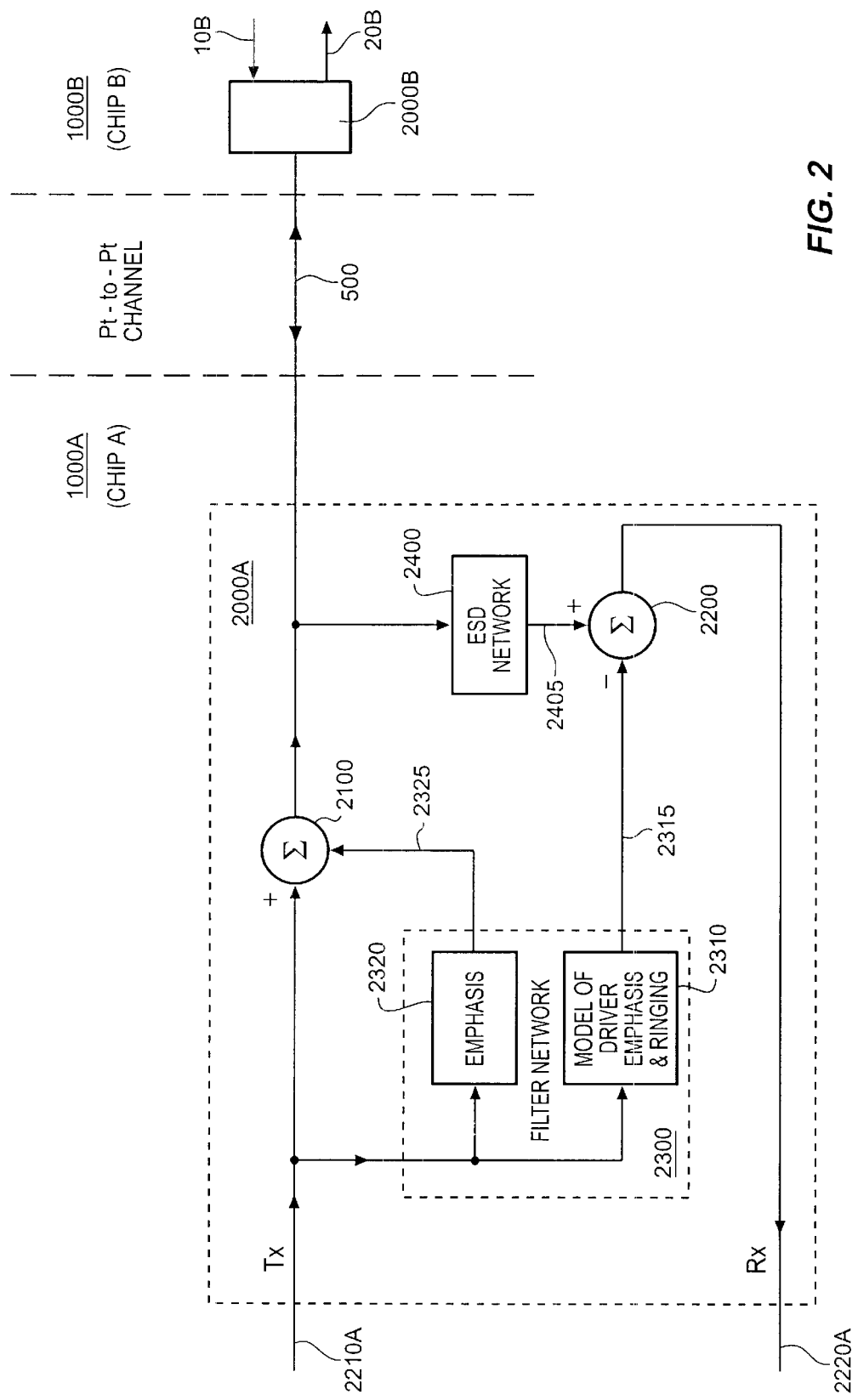
FIG. 2 is an abstract diagram of the system of the present invention.

The instant invention modifies the linear predictor in a number of ways to enhance the extraction of signals transmitted over less than ideal circuits. FIG. 2 is a highly abstract diagram of the system of an illustrative embodiment of the present invention. A modified linear predictor is used in each of two channel interface full-duplex transceiver circuits 2000A and 2000B respectively within integrated circuits (chips 1000A and 1000B) at both ends (A and B) of a bi-directional point-to-point channel (signal line 500). The invention uses summer 2200 to subtract the contribution of the transmit data 2210A from the full-duplex signal 500 in order to generate receive data 2220A. Depending on the context, the summer 2200 alone, or the entire transceiver block 2000, may also loosely be referred to as an echo canceller. Summer 2100 is added to enable the augmentation of the transmit data with an emphasis component 2325, from filter 2320, to at least in part compensate for high-frequency attenuation that acts to round the edges of the data.

The adaptive filter 2310 outputs a predictive signal 2315 that takes into account the output of the driver, the use of emphasis, and the ringing of the line. In a preferred embodiment the communications channel uses point-to-point interconnect. The fact that there are no stubs or other impedance discontinuities bounds the channel characteristics and makes the nature of the line ringing relatively predicable. The adaptive filter may be more broadly viewed as filter network 2300, and the individual filter functions 2320 and 2310 may share one or more common components. As such, the functions shown within filter network 2300 may exist more as a matter of conceptual partitioning rather than as physically different circuits.

An adaptation algorithm calibrates the adaptive filter 2310 (or 2300, as appropriate) on each side of the channel by shorting the transmitter on the far (remote) side and adjusting the adaptive filter on the near (local) side to match the ringing inherent in the channel interconnect. ESD protection network 2400 is added to protect the gates of summer 2200.

Figure 3:
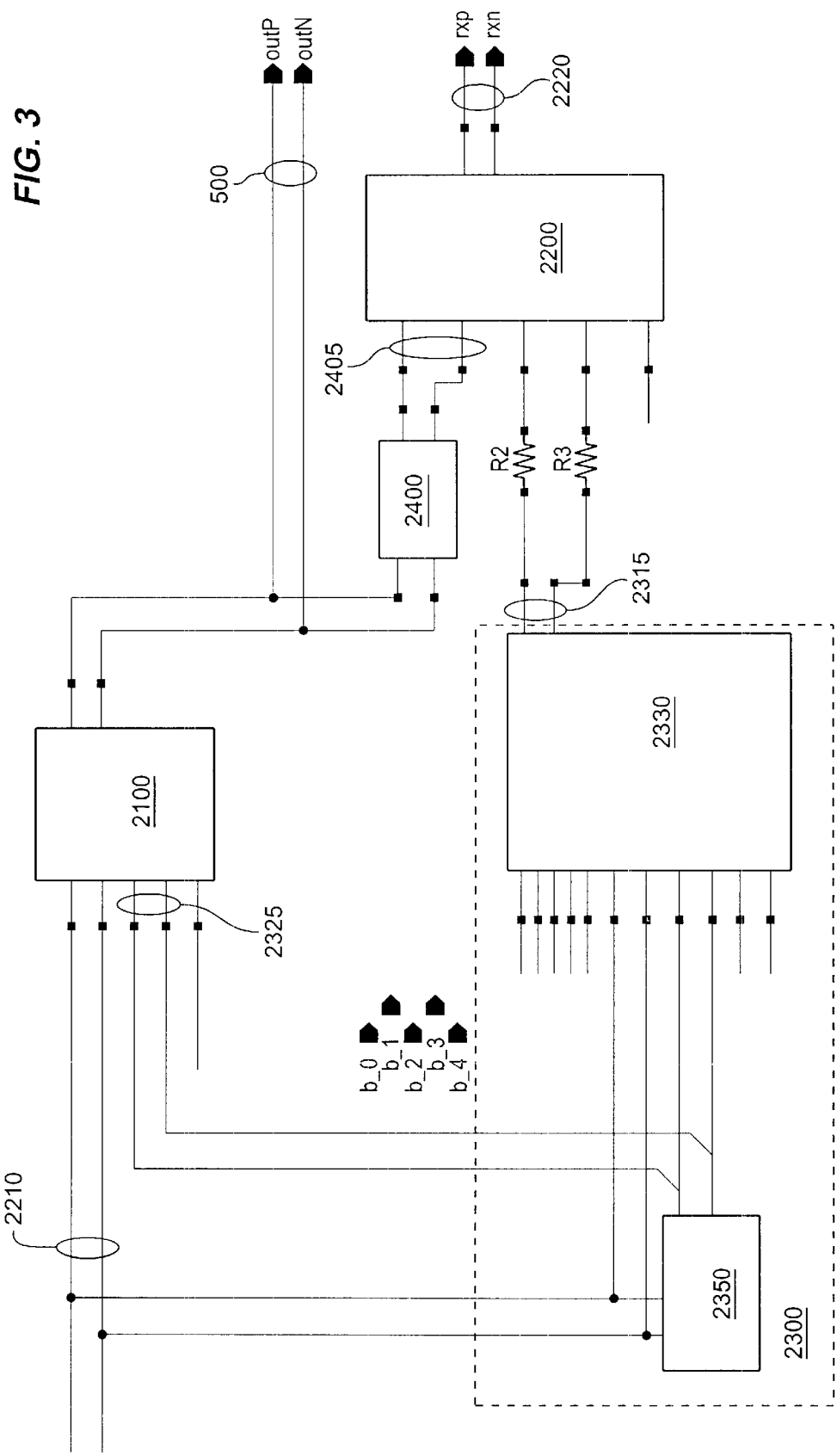
FIG. 3 is a top-level diagram of the circuit of the present invention.

FIG. 3 is a top-level diagram of the circuit of an illustrative embodiment of the present invention. Much of the system is implemented using differential (analog) or complementary (digital) signaling. The differential signaling is indicated on this and other figures by the use of P/N or P/M suffixes, or +/− symbols. Filter 2300 is here divided into blocks 2350 and 2330. Block 2350 includes the generation of the delay signals (tap signals). Block 2330 includes the tap coefficient programmable current sources, the differential pairs, and the common-load summation circuitry.

Figure 4:
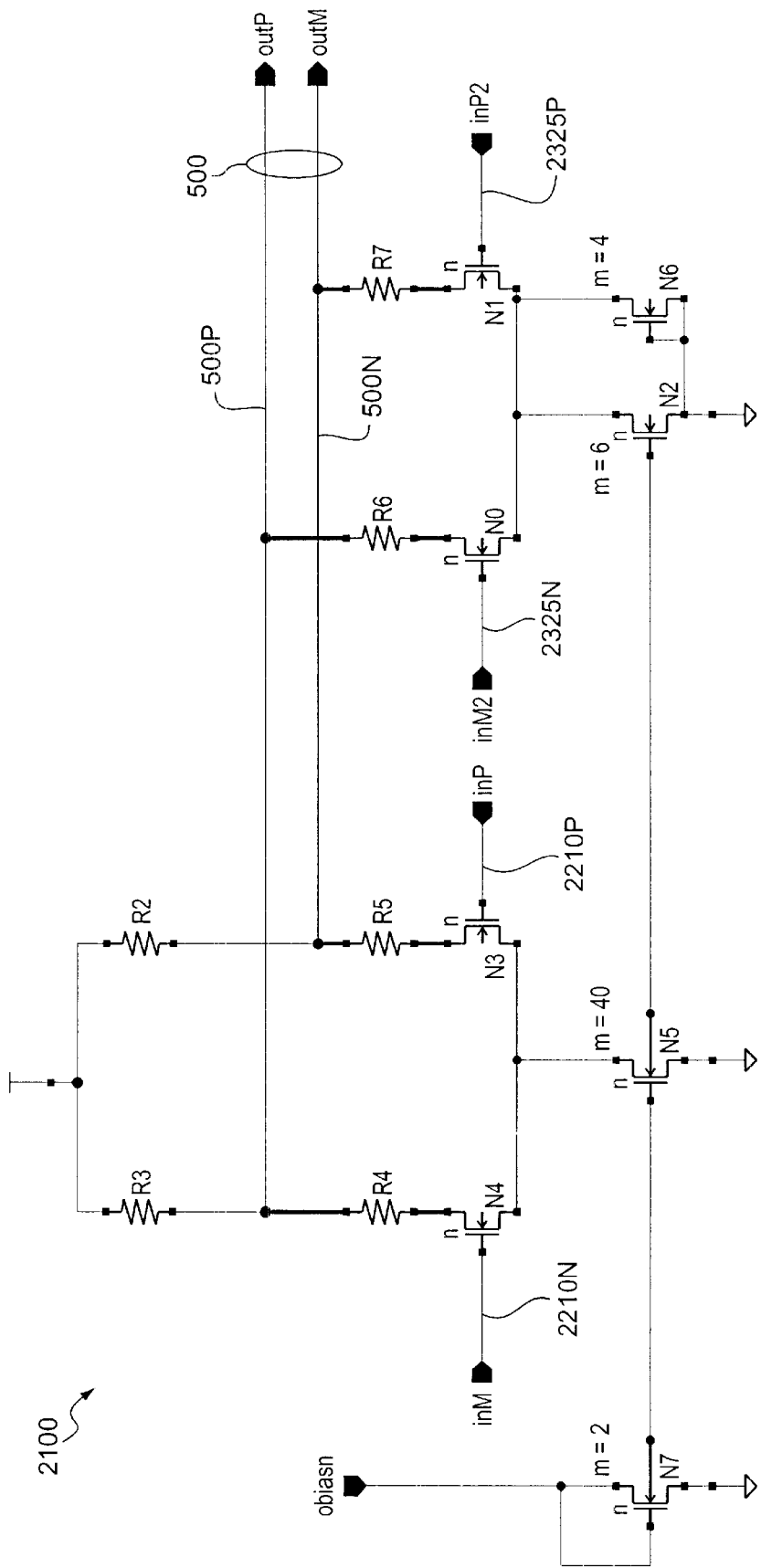
FIG. 4 is a circuit diagram corresponding to the summer 2100 of FIG. 3.

FIG. 4 is a circuit diagram corresponding to the summer 2100 of FIG. 3. True and complement transmit data is respectively mapped into +1 and −1 differential signaling levels and respectively applied to differential pair inputs 2210P and 2210N. The emphasis component from filter 2320 is applied as a +1, −1 differential signal to differential pair inputs 2325P and 2325N. The signal on the point-to-point channel 500 is differential as well.

Figure 5:
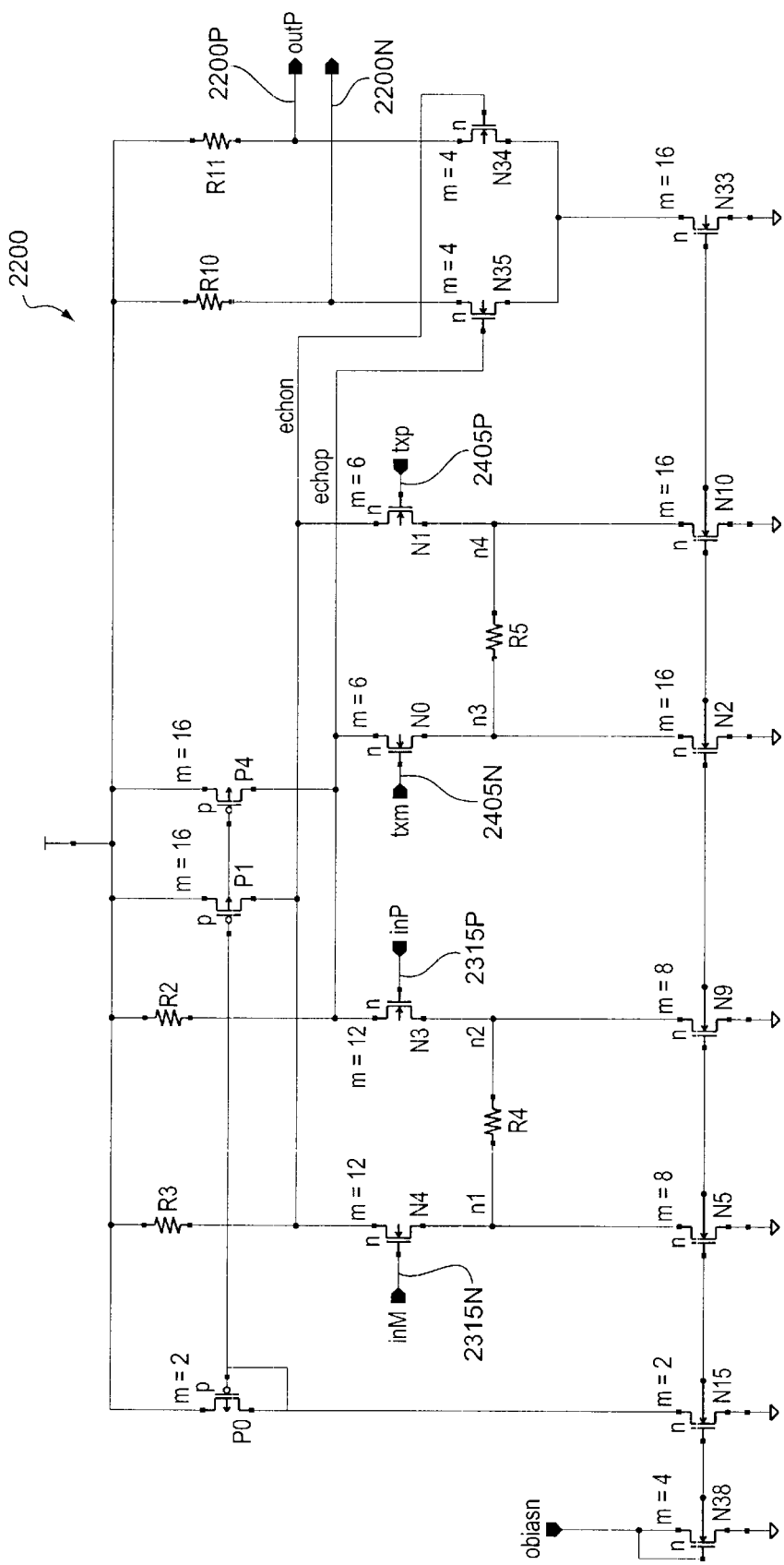
FIG. 5 is a circuit diagram corresponding to the summer 2200 (also referred to as the echo canceller) of FIG. 3.

FIG. 5 is a circuit diagram corresponding to the summer 2200 (also referred to as the echo canceller) of FIG. 3. The channel 500 is coupled via ESD Network 2400 to the summer 2200 using inputs 2405P and 2405N. The adaptive filter 2300 is could to the summer 2200 using differential signals 2315P and 2315N. The summer 2200 generates the differential receive data signals 2200P and 2200N.

In performing the circuit design of the summers, even though the small-signal swing is not very sensitive to impedance mismatches, it is still advisable to carefully implement the resistors to minimize variations and mismatches. There are likely other circuits than the ones disclosed that can achieve the same goal, but the ones disclosed were specifically chosen and designed to provide linearity at high speed.

FIR Model

Figure 6:
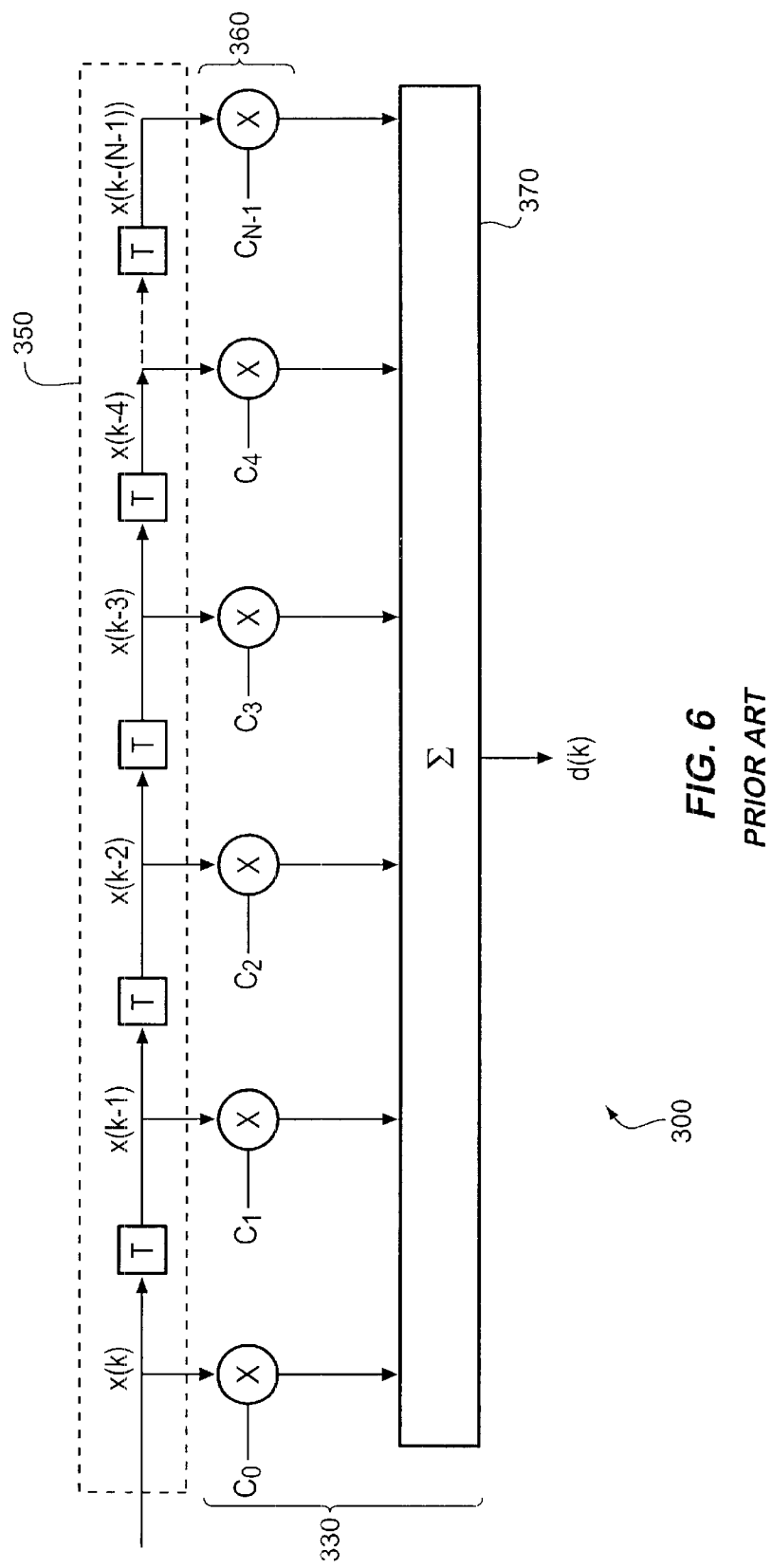
FIG. 6 shows a prior-art canonical signal flow graph of a finite impulse response filter.

FIG. 6 shows a prior-art canonical signal flow graph of a finite impulse response filter (FIR) 300. The FIR filter 300 includes a tapped delay line 350, coefficient multipliers 360, and summer (also referred to as an accumulator) 370. As will be see in the discussion to follow, tapped delay line 350 conceptually corresponds with function block 2350 of filter network 2300. The coefficient multipliers 360 and the summer 370, taken collectively 330 conceptually correspond with function block 2330 of filter network 2300. In a preferred embodiment a 5-tap FIR filter is chosen. That is, in addition to the original signal to be filtered, 4 additional different delayed versions of the original signal are created, for a total of 5 different delay versions of the original signal. It is possible to generate these delay versions in a number of ways, the most straightforward being a shift register.

Figure 7:
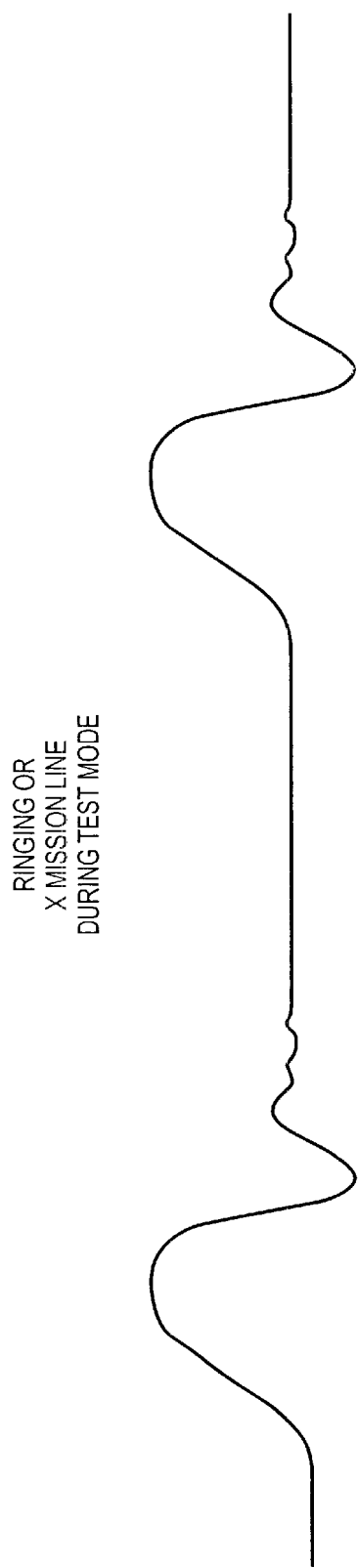
FIG. 7 is an exemplary sketch illustrating the signal ringing that occurs on the point-to-point channel interconnect.

FIG. 7 is an exemplary sketch illustrating the signal ringing that occurs on the point-to-point channel interconnect. The present invention uses an FIR filter in a linear predictive system to attempt to cancel the ringing of the channel. Specifically, the transfer function of the FIR filter is designed to mimic the reflections of the channel in the absence of transmit data from the remote end of the channel. (The same technique being applied to both channel ends.)

Low-Level Circuit Implementation of FIR Filter

Time Division Multiplexing and Transmit Data Delay Vector

Figure 8:
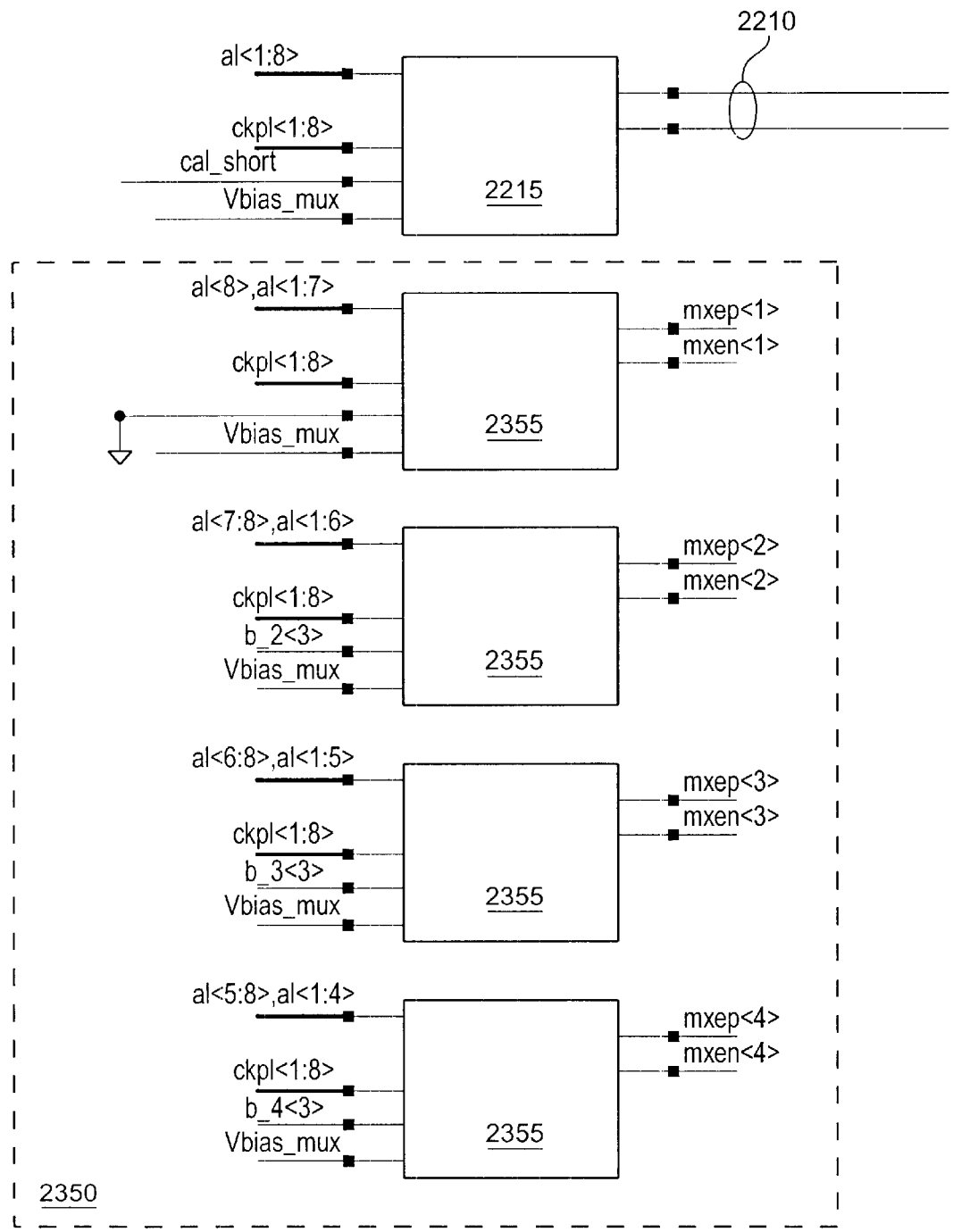
FIG. 8 is a block diagram that includes the multiplexer and delay functions contained within the filter sub-block 2350 of FIG. 3 as well as a multiplexer and calibration switch responsible for generating the input 2210 that drives summer 2100, also of FIG. 3. The delay functionality roughly corresponds to the tapped delay line of FIG. 6.
Figure 9:
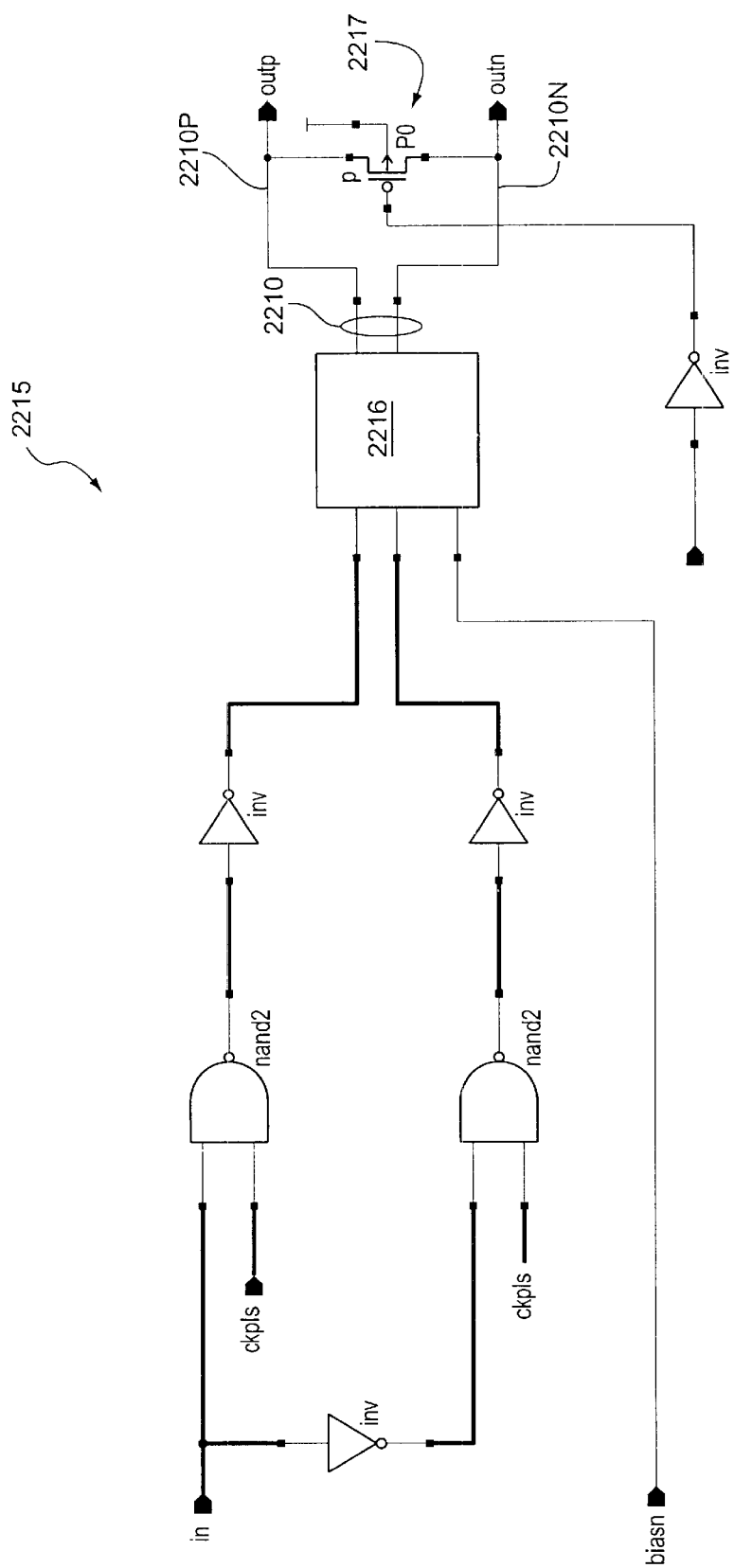
FIG. 9 is a circuit diagram of the multiplexer and switch responsible for generating the input 2210 that drives summer 2100 of FIG. 3.
Figure 10:
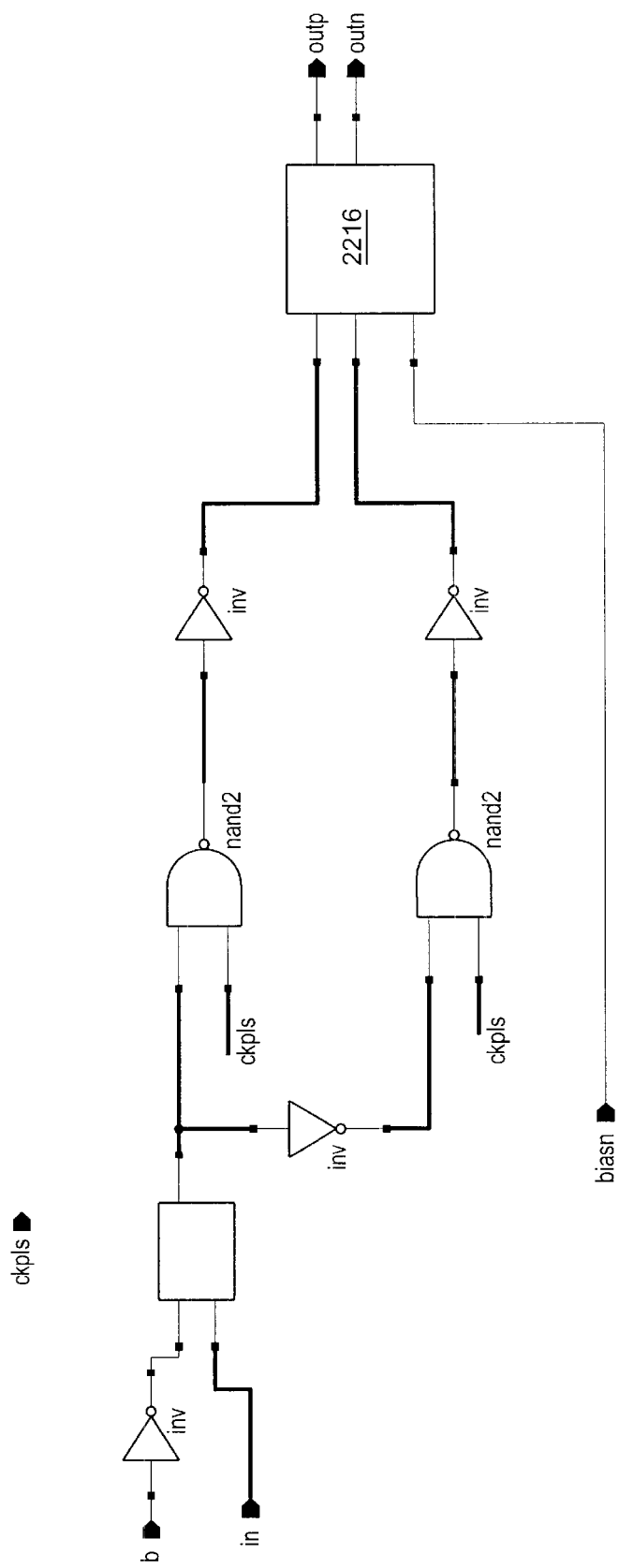
FIG. 10 is a circuit diagram of the multiplexer and delay functions of FIG. 8.
Figure 11:
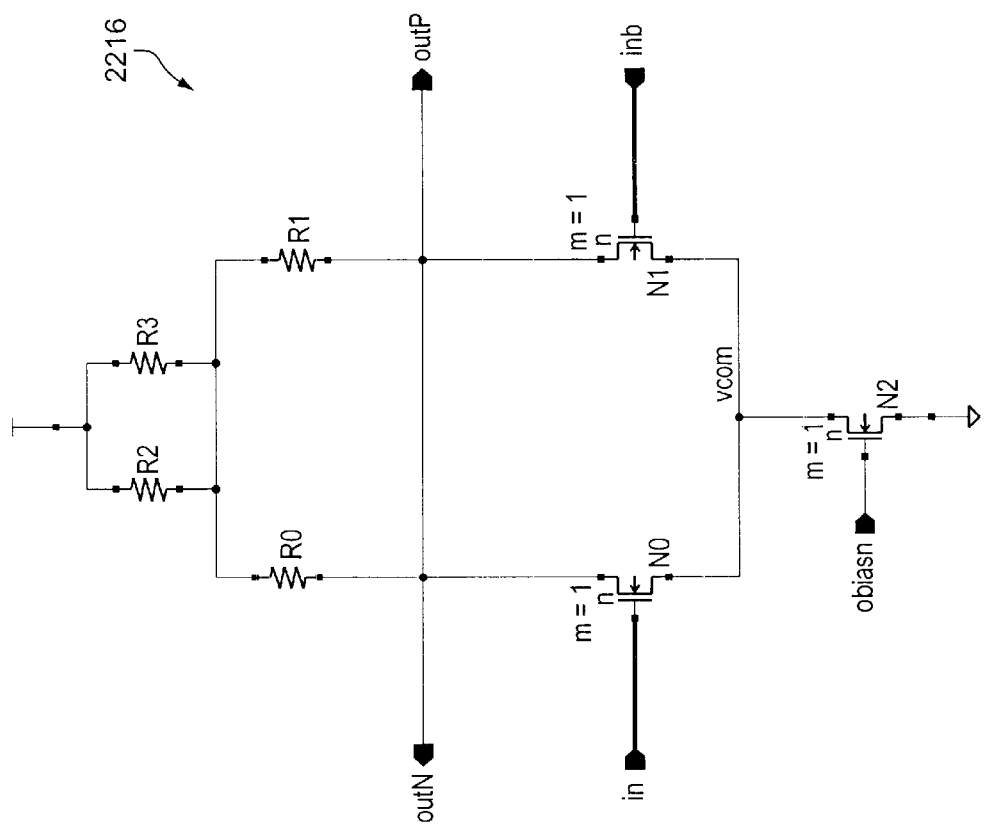
FIG. 11 is a more detailed circuit diagram of the multiplexer of FIGS. 9 and 10.

In an illustrative embodiment, the transmit data is time-multiplexed to transfer multiple bits of a data word over the same interconnect. An 8-bit parallel data vector is serialized by 8 clock phases that are separated by ⅛-th of a core clock cycle. Also, a delayed version of the data is generated for FIR through the txmuxfir (block 2355) and txmuxfir_a (block 2215) circuits of FIG. 8, permitting the tap delays to be implemented via bit routing instead of requiring some form of shift register. While not necessary to practice the invention, it is possible to realize efficiencies by combining the multiplexer and delay functions into a common circuit. FIG. 8 is a block diagram that includes the multiplexer and delay function logic blocks 2355 contained within the filter sub-block 2350 of FIG. 3 as well as a multiplexer and calibration switch logic block 2215 responsible for generating the input 2210 that drives summer 2100, also of FIG. 3. FIG. 9 is a circuit diagram of the logic block 2215 (including multiplexer 2216 and switch 2217) responsible for generating the input 2210 (including differential signals 2210P and 2210N) that drives summer 2100 of FIG. 3. FIG. 10 is a circuit diagram of the multiplexer and delay function logic blocks 2355 (including multiplexer 2216) of FIG. 8. FIG. 11 is a more detailed circuit diagram of the multiplexer 2216 of FIGS. 9 and 10.

The delay functionality embodied in the circuits of FIGS. 8 through 10 roughly corresponds conceptually to the tapped delay line of FIG. 6. For the data signaling application of the illustrative embodiment the X(T) signal of FIG. 6 need only be a digital binary vector, with each tap value representing either logical one and zero. For the low-level circuit implementation of the illustrative embodiment, logical one is mapped to a physical +1 value, while logical zero is mapped to a negative one value (−1). The delay outputs of each logic blocks 2355 in block 2350 are differential outputs that are always a +1, −1 pair, and no other values.

Coefficient Multipliers

Figure 12:
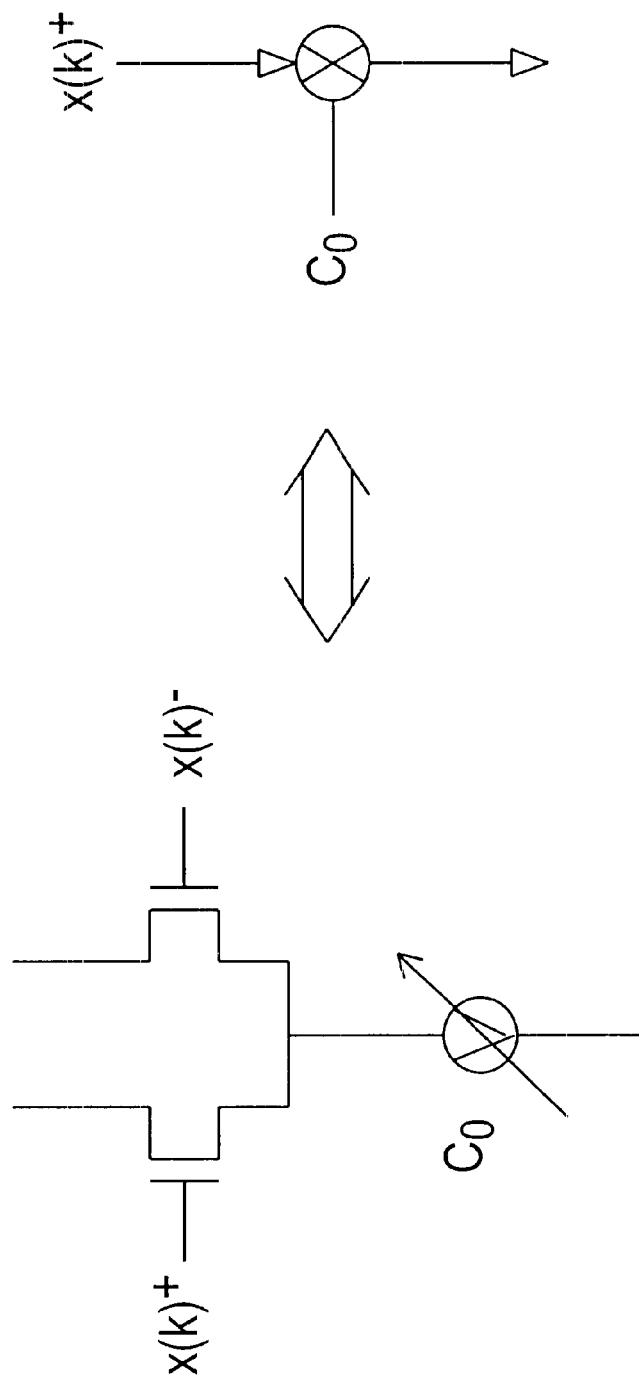
FIG. 12 shows the correspondence between the coefficient multiplier of FIG. 6 and a differential pair with a programmable current source, according to the present invention.

FIG. 12 shows the conceptual correspondence between the coefficient multiplier of FIG. 6 and a differential pair with a programmable current source for the tail current of the differential pair, according to the present invention. The programmable current source is implemented as a digital to analog converter (DAC). The DAC develops an analog current, the coefficient current, that is proportional to the multiplier coefficient. The +1, −1 differential outputs from the signal input X(k) (or the delayed "tap" versions thereof, X(k−1), X(k−2), etc.) drive the inputs of the corresponding complementary differential pair. The tap differential signals act to switch the coefficient current to one of the two legs (load circuits) of the differential pair. Thus, one leg must source the entire coefficient current, while the other leg sources zero current.

Summation of Multiplier Outputs

Figure 13:
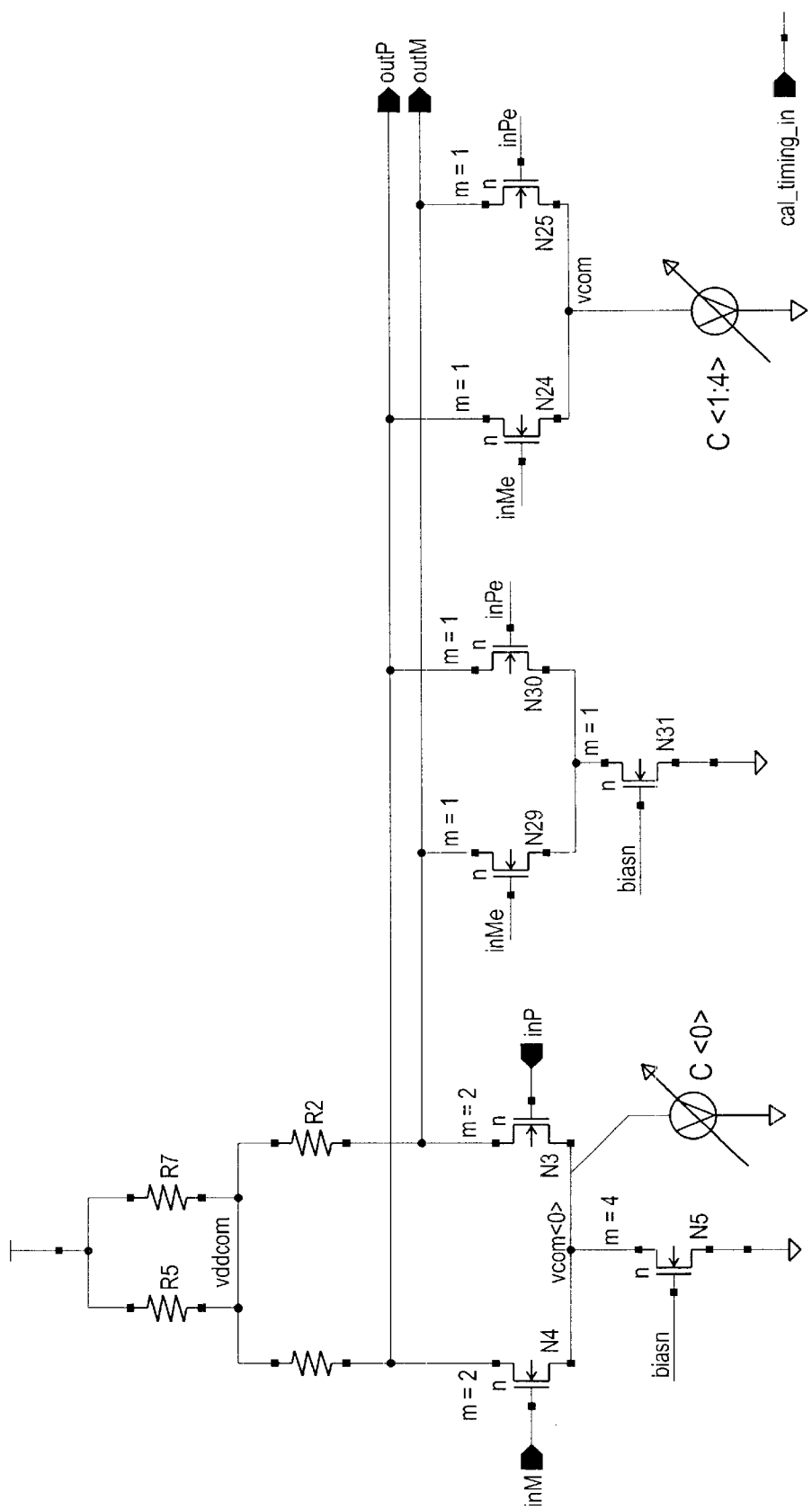
FIG. 13 is a circuit diagram applying the technique of FIG. 12 to implement the coefficient multiplier and accumulator functions of FIG. 6.

FIG. 13 is a circuit diagram applying the technique of FIG. 12 to implement the coefficient multiplier and accumulator functions of FIG. 6. The differential pairs are wired in parallel, such that all left-legs and all right-legs share common left and right load circuits, respectively. Thus the currents switched by each differential pair are summed in the common load circuits.

Conceptually, one should also view portions of the left two differential pairs of FIG. 13 as a replica of the summer 2100 of FIG. 4. This replica provides a starting point for canceling the transmit-data and the emphasis component driven onto the channel. The additional additions and subtractions are then provided based on the FIR model.

Figure 14:
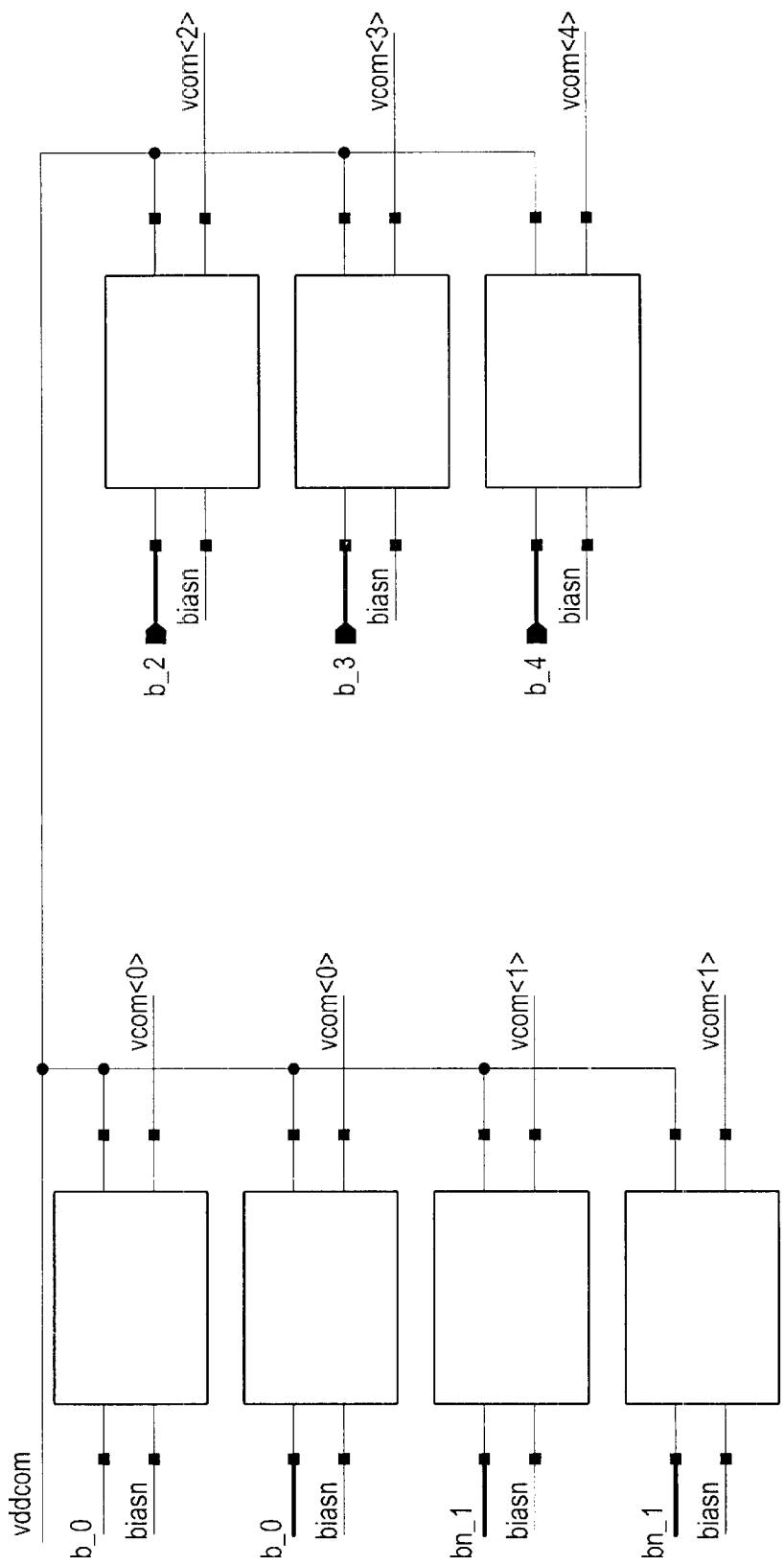
FIG. 14 is a block diagram of the programmable current sources associated with the circuit of FIG. 13.
Figure 15:
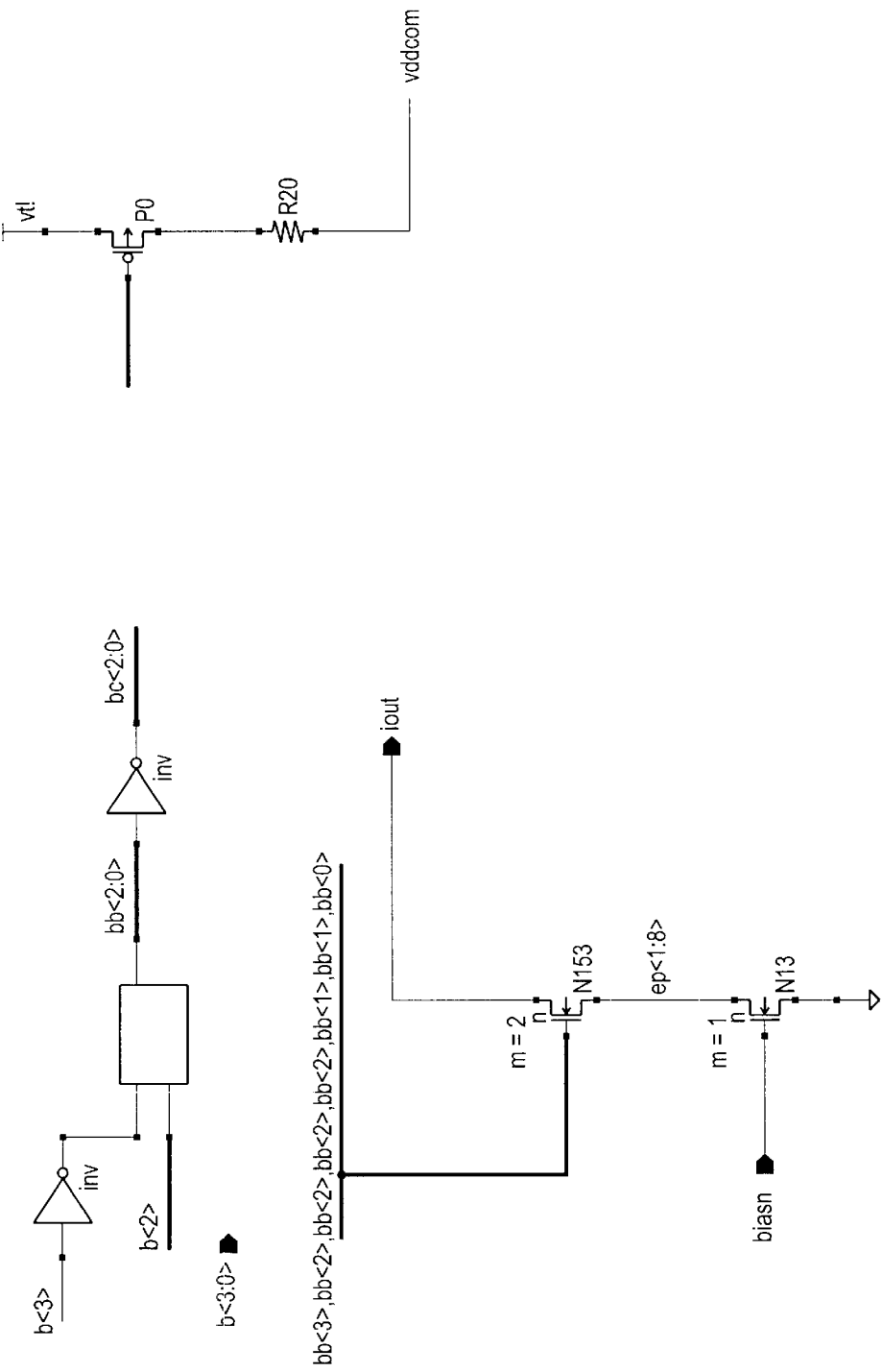
FIG. 15 is a circuit diagram of corresponding to each of the programmable current sources of FIG. 14.

Five, 4-bit coefficients (C0–C4) are provided by digital logic. Each 4-bit coefficient defines a 16-level discrete analog current value. FIG. 14 is a block diagram of the programmable current sources associated with the circuit of FIG. 13. FIG. 15 is a circuit diagram of corresponding to each of the programmable current sources of FIG. 14.

Adaptive Echo Cancellation

The filters are adaptive and adaptive echo cancellation is employed in the sense that the tap coefficients of the filter are initialized at each power-up to match (adapt to) the line characteristics of the point-to-point wiring interconnecting the transceivers. Other than the initialization process, no other adaptive calibration is performed or required.

During initialization an iterative process optimizes the tap coefficient vector C. The preferred embodiment uses the Least Mean Square (LMS) algorithm (also known as the gradient search or stochastic gradient technique) as described in section 3.4.1 of the Westall reference (cited above). Specifically, an error surface is conceptually defined, consisting of a plot in N+1 dimensional space of the mean square error (MSE). The MSE is an N-dimensional quadratic equation in the tap coefficient space, where N is the number of taps. Conceptually, the error surface is bowl shaped with a global minimum and no local minima. For any C, there is an associated gradient on the MSE surface. To find the global minimum MSE, where the error surface also has zero slope, the value of C is repeatedly modified using the negative direction of the gradient of the mean square error vector. After a sufficient number of iterations, the minimum point of the error surface is reached, at which point the tap coefficient vector will be at its optimum (Copt).

During initialization, the receive filters at each end of every point-to-point channel are adapted to the situation-specific configuration of the channel interconnect through a training procedure. The following procedure is performed sequentially for each of the two channel interfaces. The closed loop output error of the local receiver is observed while the local transmitter sends a known pseudo random pattern and the remote transmitter effectively shorts out the other end of the channel. Based on the observed error, if the error gradient is not yet zero, new values for the tap coefficients are generated and the process is repeated with the updated tap coefficients. An uncorrelated white-noise pattern provides the best convergence performance.

CONCLUSION

The invention broadly permits the real-time signal processing of high-speed digital signals by performing a low-level circuit implementation of signal flow graphs. As would be apparent to one skilled in the art given this description, the present invention is not limited to the extraction of received data over a full-duplex communications channel.

While various embodiments of the present invention have been described above, it should be understood that they have been presented by way of example only, and not limitation. It will be understood by those skilled in the art that various changes in form and details may be made herein without departing from the spirit and scope of the invention as defined in the appended claims. Thus, the breadth and scope of the present invention should not be limited by any of the above-describe exemplary embodiments, but should be defined only in accordance with the following claims and their equivalents.

We claim:

1. A chip-to-chip interface comprising:

a connection coupling a first chip to a second chip;

in the first chip, a first transceiver configured to transfer a first signal to the second chip over the connection and receive a second signal from the second chip over the connection, and process the first signal to predict first signal echo and remove the predicted first signal echo from the second signal; and in the second chip, a second transceiver configured to transfer the second signal to the first chip over the connection and receive the first signal from the first chip over the connection, and process the second signal to predict second signal echo and remove the predicted second signal echo from the first signal.

2. The chip-to-chip interface of claim 1 wherein the first signal and the second signal form a full-duplex signal on the connection, and:

the first transceiver is configured to remove the first signal and the predicted first signal echo from the full-duplex signal; and the second transceiver is configured to remove the second signal and the predicted second signal echo from the full-duplex signal.

3. The chip-to-chip interface of claim 1 wherein:

the first transceiver includes a first filter configured to process the first signal to predict the first signal echo based on first tap coefficients and is configured to adaptively set the first tap coefficients during an initialization process when the first transceiver is transmitting a test signal and the second transceiver is not transmitting; and the second transceiver includes a second filter configured to process the second signal to predict the second signal echo based on second tap coefficients and is configured to adaptively set the second tap coefficients during the initialization process when the second transceiver is transmitting the test signal and the first transceiver is not transmitting.

4. The chip-to-chip interface of claim 3 wherein first transceiver and the second transceiver are configured to initiate the initiation process in response to power-up.

5. A method of operating a chip-to-chip interface where a connection couples a first chip to a second chip, the method comprising;

in the first chip, transferring a first signal to the second chip over the connection and receiving a second signal from the second chip over the connection, and processing the first signal to predict first signal echo and removing the predicted first signal echo from the second signal; and in the second chip, transferring the second signal to the first chip over the connection and receiving the first signal from the first chip over the connection, and processing the second signal to predict second signal echo and removing the predicted second signal echo from the first signal.

6. The method of claim 5 wherein the first signal and the second signal form a full-duplex signal on the connection, and:

in the first chip, removing the predicted first signal echo from the second signal comprises removing the predicted first signal echo from the full-duplex signal, and further comprising removing the first signal from the full-duplex signal; and in the second chip, removing the predicted second signal echo from the first signal comprises removing the predicted second signal echo from the full-duplex signal, and further comprising removing the second signal from the full-duplex signal.

7. The method of claim 5 wherein:

processing the first signal to predict the first signal echo comprises using a first filter to process the first signal based on first tap coefficients and further comprising adaptively setting the first tap coefficients during an initialization process when the first transceiver is transmitting a test signal and the second transceiver is not transmitting; and processing the second signal to predict the second signal echo comprises using a second filter to process the second signal based on second tap coefficients and further comprising adaptively setting the second tap coefficients during the initialization process when the second transceiver is transmitting the test signal and the first transceiver is not transmitting.

8. The method of claim 7 further comprising initiating the initiation process in response to power-up.

9. A transceiver for a first chip that is coupled to a second chip by a connection wherein the first chip is configured to transfer a first signal to the second chip over the connection, the second chip is configured to transfer a second signal to the first chip over the connection, and the first signal and the second signal form a full-duplex signal on the connection, the transceiver comprising:

a driver configured to generate the first signal;

circuitry configured to process the first signal to predict first signal echo and remove the first signal and the predicted first signal echo from the full-duplex signal to obtain the second signal.

10. The transceiver of claim 9 wherein the circuitry comprises:

delay circuitry configured to generate a plurality of delayed first signals;

digital-to-analog conversion circuitry configured to process the first signal and the delayed first signals to generate a predictive signal comprising the first signal and the predicted first signal echo; and summation circuitry configured to remove the predictive signal from the full-duplex signal to obtain the second signal.

11. The transceiver of claim 9 wherein the circuitry includes a filter configured to process the first signal based on tap coefficients to predict the first signal echo, and the circuitry is configured to adaptively set the first tap coefficients during an initialization process when the first chip is transmitting a test signal and the second chip is not transmitting.

12. The transceiver of claim 11 wherein the circuitry is configured to initiate the initiation process in response to power-up.

13. A method of operating a transceiver for a first chip that is coupled to a second chip by a connection wherein the first chip transfers a first signal to the second chip over the connection, the second chip transfers a second signal to the first chip over the connection, and the first signal and the second signal form a full-duplex signal on the connection, the transceiver comprising:

processing the first signal to predict first signal echo; and removing the first signal and the predicted first signal echo from the full-duplex signal to obtain the second signal.

14. The method of claim 13 wherein processing the first signal to predict the first signal echo and removing the first signal and the predicted first signal echo from the full-duplex signal comprises:

generating a plurality of delayed first signals;

processing the first signal and the delayed first signals to generate a predictive signal comprising the first signal and the predicted first signal echo; and removing the predictive signal from the full-duplex signal to obtain the second signal.

15. The method of claim 13 wherein processing the first signal to predict the first signal echo comprises using filter configured to process the first signal based on tap coefficients to predict the first signal echo, and further comprising adaptively setting the first tap coefficients during an initialization process when the first chip is transmitting a test signal and the second chip is not transmitting.

16. The method of claim 15 further comprising initiating the initiation process in response to power-up.

* * * * *

UNITED STATES PATENT AND TRADEMARK OFFICE
CERTIFICATE OF CORRECTION

PATENT NO. : 6,469,988 B1 Page 1 of 1
APPLICATION NO. : 09/349832
DATED : October 22, 2002
INVENTOR(S) : Yang et al.

It is certified that error appears in the above-identified patent and that said Letters Patent is hereby corrected as shown below:

On the Title Page,
Item "(63) Continuation-in-part of application No. 08/986,430, filed Dec. 7, 1997, now Pat. No. 6,065,077, and a continuation-in-part of application No. 09/163,294, filed on Sep. 29, 1998, and a continuation-in-part of application No. 09/281,749, filed on Mar. 30, 1999." has been deleted.

Signed and Sealed this

Twenty-fifth Day of May, 2010

David J. Kappos
*Director of the United States Patent and Trademark Office*